United States Patent [19]
Lloyd et al.

[11] 3,849,333
[45] Nov. 19, 1974

[54] SEMI-CONDUCTING POLYMER SYSTEM COMPRISING A COPOLYMER OF ETHYLENE-ETHYLARCRALATE OR VINYL ACETATE, ETHYLENE-PROPYLENE-TERMONOMER AND CARBON BLACK

[75] Inventors: Keith Andrew Lloyd, Plainfield; Eugene Jay Fisher, Brunswick, both of N.J.

[73] Assignee: Union Carbide Corporation, New York, N.Y.

[22] Filed: Sept. 26, 1972

[21] Appl. No.: 292,338

[52] U.S. Cl. ............ 252/511, 260/37 R, 260/897 B
[51] Int. Cl. ......................... H01b 1/04, C09b 1/48
[58] Field of Search ........ 252/511; 260/897 B, 37 R

[56] References Cited
UNITED STATES PATENTS

| 3,155,631 | 11/1964 | Zapp | 252/511 X |
| 3,245,931 | 4/1966 | Matthew | 260/897 B X |
| 3,361,850 | 1/1968 | Young | 260/897 B X |
| 3,510,448 | 5/1970 | Byler et al. | 252/511 X |
| 3,533,976 | 10/1970 | Eidman | 260/897 B |
| 3,629,154 | 12/1971 | Johnson | 260/897 B X |

*Primary Examiner*—Carl D. Quarforth
*Assistant Examiner*—R. E. Schafer
*Attorney, Agent, or Firm*—Francis M. Fazio

[57] ABSTRACT

Semi-conducting compositions of (i) a copolymer of ethylene-ethyl acrylate or ethylene-vinyl acetate, (ii) an ethylene-propylene-termonomer elastomer, and (iii) a conducting carbon black.

5 Claims, No Drawings

SEMI-CONDUCTING POLYMER SYSTEM COMPRISING A COPOLYMER OF ETHYLENE-ETHYLARCRALATE OR VINYL ACETATE, ETHYLENE-PROPYLENE-TERMONOMER AND CARBON BLACK

BACKGROUND OF THE INVENTION

Semi-conducting compositions containing an ethylene polymer and a conducting carbon black have long been known and used in the manufacture of electrical conductors. These compositions have varied in their polymers content and have included mixtures of polyethylene with various polymers such as ethylene-ethyl acrylate, ethylene-vinyl acetate, ethylene-propylene-hexadiene copolymers, and the like. In order to overcome the undesirable properties imparted to the composition by the presence of the large amounts of the carbon black required to make the composition semiconductive it has been found desirable to employ those ethylene copolymers having high comonomer contents to achieve the correct balance of physical and conductive properties. The literature is replete with such compositions and in this regard one can mention, as a partial listing, U.S. Pat. No. 3,178,384, U.S. Pat. No. 3,510,448 and German Offenlegungschrift No. 1,719,251. The use of such semi-conducting compositions, the manner of their preparation and their desired properties are so well known and described in the literature, as also are their deficiencies, that no further discussion is required here to enable one skilled in the art to understand how the polymer components are produced and used in the preparation of the semiconducting compositions.

DESCRIPTION OF THE INVENTION

It has been found that certain specific ethylene copolymer compositions having a low comonomer content, either by direct polymerization or by blending, when combined with ethylene-propylene-termonomer terpolymers and conducting carbon black, yield semiconducting compositions that not only have the desired physical properties but are suprisingly improved in deformation resistance, solvent resistance, and conductivity when compared to heretofore known compositions which utilized ethylene copolymers having a high comonomer content. The compositions of this invention have over-all improved properties, a completely unexpected and unobvious finding.

The ethylene copolymers useful in this invention are the copolymers of ethylene and a comonomer which is either ethyl acrylate or vinyl acetate. The comonomer is present in the ethylene copolymer molecule at a critical concentration of from 2 to 5 weight per cent, preferably from 3 to 5 weight per cent. The ethylene copolymers and the methods for their production are well known to those skilled in the art and do not require extensive description herein. It will suffice to say that they are produced by polymerization at elevated temperature and pressure in contact with a known free radical initiator. The copolymers are those that preferably have a melt index below 3.5 decigrams per minute and more preferably from 0.5 to 2 decigrams per minute.

The ethylene-propylene-termonomer terpolymers are also well known and many are commercially available. The termonomer component of these elastomeric terpolymers can be 1,4-hexadiene, dicyclopentadiene, methylcyclopentadiene, 5-ethylidenebicyclo[2.2.1]hept-2-ene, or any other termonomer known in the art as suitable. The terpolymers usually 28 from 15 to 35 weight per cent propylene and from 1.5 to 10 weight per cent termonomer in the molecule. Their production is disclosed, for instance, in U.S. Pat. Nos. 2,699,457, 2,930,781, 3,933,480, 3,000,866, 3,000,867, 3,033,835, 3,063,973, 3,093,620, 3,162,620 and 3,211,709.

The conducting carbon blacks are well known and any suitable form can be used, including oil furnace blacks or acetylene blacks, provided that they are conducting.

The conventional additives, in the conventionally used quantities, can be present in the semi-conducting compositions of this invention. These include additives such as stabilizers, antioxidants, pigments, lubricants, ultraviolet stabilizers, antiblock agents and the like, and they are added by the known procedures. Also present can be small amounts of other polymers.

The semi-conducting compositions of this invention contain from 3 to 20 weight percent, preferably from 5 to 15 weight percent, of the ethylene-propylene-termonomer terpolymer and from 25 to 50 weight percent, preferably from 30 to 40 weight percent, of the conducting carbon black, with the balance being the ethylene-ethyl acrylate or ethylene-vinyl acetate copolymer.

The semi-conducting compositions of this invention can, unexpectedly, withstand higher cable operating temperatures and are less subject to attack by solvents; they are characterized, generally, by low temperature coefficients of resistivity, low heat distortion values, high solvent resistance and good extrudability properties. All of these properties are important in insulation shielding compositions for power conductors.

A low temperature coefficient of resistivity is desired in a semi-conducting composition to permit use at higher operating temperatures. Use of higher operating temperatures is the current trend in this field and at the higher temperatures the compositions experience larger decreases in conductivity with concomittant increases in temperature coefficient of resistivity. The instant compositions have low temperature coefficients of resistivity and thus can be used at the higher operating temperatures.

A low heat distortion value is desirable to minimize the volumetric expansion of the semi-conducting composition and thus minimize the possibility of dislocation or separation of the concentric neutral in the cable structure and the disruption of its function. High solvent resistance is an important factor where the cable is buried in the ground or comes into contact with motor oils, transformer oils, wood preservatives, or any other solvent. Migration of solvent into the polymer can occur under such circumstances and the swelling causes dimensional changes in the spacing of the carbon particles causing an undesirable increase in the resistivity of the semi-conducting composition.

Good extrudability is important not only from the point of view of esthetics but also the ability to extrude smoothly generally results in the formation of a better bond between the semi-conducting composition and the adjacent surface.

The increased service demands on the distribution cables such as higher amperages and higher temperatures can be accomodated by the use of the semi-conducting compositions of this invention.

In the following examples the test procedures used were those known in the art. Brittleness was determined by ASTM D-746; secant modulus, tensile strength, and elongation by ASTM D-638; and volume resistivity by ASTM D-257. Resistance to ASTM No. 3 oil was determined by calculating the percent weight change after immersion in the oil at 23°C. for periods of 1 day and 7 days. Melt index of the polymers and compositions was determined by ASTM D-1238 and density by ASTM D-1505.

EXAMPLE 1

A semi-conducting composition was produced by compounding, on a Banbury mixer, 53.8 parts of an ethyleneethyl acrylate copolymer having a melt index of 1.5 dgm./min. and an average ethyl acrylate content of about 4 weight per cent, 10 parts of an ethylene-propylene-1,4-hexadiene terpolymer wherein the ratio of each component is 72.5-25-2.7, 36 parts of a conductive oil furnace carbon black having an average particle size of 26 to 30 milimicrons and 0.2 part of polymerized 1,2-dihydro-2,2,4-trimethylqiunoline. A portion of the composition was molded into test plaques and evaluated.

For comparative purposes a series of semiconductive compositions was produced in the same manner, as identified below.

Control A

A semi-conducting composition was prepared using 53.8 parts of an ethylene-ethyl acrylate copolymer having a melt index of 4.5 dgm./min. and an ethyl acrylate content of 18.5 weight per cent and 10 parts of the same terpolymer, 36 parts of the same carbon black and 0.2 part of the same stabilizer used in Example 1. In this control the ethylene copolymer had a high ethyl acrylate content.

Control B

A semi-conducting composition was prepared using 63.8 parts of the same copolymer, 36 parts of the same carbon black and 0.2 part of the same stabilizer used to prepare the composition of Example 1. This control did not contain terpolymer.

Control C

A semi-conducting composition was prepared using 63.8 parts of the copolymer used to prepare Control A and 36 parts of the same carbon black and 0.2 part of the same stabilizer used to prepare the composition of Example 1. This control contained a copolymer having a high ethyl acrylate content but did not contain terpolymer.

Control D

A semi-conducting composition was prepared using 53.8 parts of polyethylene having a melt index of 2.0 dgm./min., and 10 parts of the same terpolymer, 36 parts of the same carbon black and 0.2 part of the same stabilizer used to prepare the composition of Example 1. This control did not contain the copolymer.

The properties of each of these compositions are set forth in the table below. In this first series ASTM No. 2 oil was used in determining oil resistance at 23°C. after one day; stress cracking was determined by ASTM D-732 with the number of samples failing after 2 days of submersion of 20 samples in the detergent solution being reported; the deformation was determined using a 10 kilogram load on a 0.5 inch stack of ⅝ inch diameter specimens.

The data in the table indicates that the semi-conducting composition of Example 1 has improved low temperature brittleness when compared to any of Controls A to D; improved elongation and lower secant modulus when compared to Controls B and D; improved stress crack resistance when compared to Control B; and improved deformation at temperatures below 100°C. and oil resistance when compared to Controls A and C.

EXAMPLE 2

A mixture of 29.8 parts of an ethylene-ethyl acrylate copolymer having a melt index of 0.1 dgm./min. and an ethyl acrylate content of 1.5 to 2 weight per cent with 14.9 parts of a second ethylene-ethyl acrylate copolymer having a melt index of 6.5 dgm./min. and an ethyl acrylate content of 12 to 13 weight per cent was prepared; this mixture had an average ethyl acrylate content of about 2.4 weight per cent. The mixture of ethylene-ethyl acrylate copolymers was blended with 20 parts of the terpolymer, 36 parts of the carbon black and 0.2 part of the stabilizer used in Example 1 to produce a semi-conducting composition having the porperties shown in the table.

EXAMPLE 3

A semi-conducting composition was produced as described in Example 1 using 44.8 parts of an ethylenevinyl acetate copolymer having a melt index of 0.8 dgm./min. and a vinyl acetate content of about four per cent by weight, and 20 parts of the terpolymer, 36 parts of the carbon black and 0.2 part of the stabilizer used in Example 1. This composition had the properties shown in the table.

|  | EXAMPLES | | | CONTROLS | | | |
|---|---|---|---|---|---|---|---|
|  | 1 | 2 | 3 | A | B | C | D |
| Brittleness, $F_{20}$, °C. | −50 | −45 | −45 | −35 | −25 | −35 | −25 |
| Secant Modulus, psi × $10^{-3}$ | 39.4 | 36.1 | 47.8 | 14.3 | 52.1 | 19.7 | 45.6 |
| Tensile strength, psi | | | | | | | |
| original | 1730 | 1910 | 1880 | 1340 | 1750 | 1390 | 1640 |
| aged, 7 days at 100°C. | 1850 | 430(a) | 1660(a) | 1470 | 2040 | 1570 | 1850 |
| Elongation,% | | | | | | | |
| original | 350 | 400 | 400 | 290 | 190 | 355 | 170 |
| aged, 7 days at 100°C. | 270 | 410(a) | 385(a) | 280 | 160 | 335 | 115 |
| Oil resistance,% | 0.31 | 1.74(b) | 1.13(b) | 1.3 | 0.4 | 1.0 | 0.4 |

—Continued

|  | EXAMPLES | | | CONTROLS | | | |
| --- | --- | --- | --- | --- | --- | --- | --- |
|  | 1 | 2 | 3 | A | B | C | D |
| Volume resistivity, ohm-cm | | | | | | | |
| at 23°C. | 11.9 | 15.6 | 87.0 | 22.7 | 11.5 | 26 | 14.1 |
| 40 | 17.2 | 76.5 | 89.0 | 45.9 | 15.7 | 74.5 | 19.8 |
| 60 | 43.3 | 108.5 | 92.8 | 229 | 25.1 | 343 | 39 |
| 80 | 274.0 | 395.7 | 130.2 | 1765 | 157 | 1970 | 162 |
| 90 | 1185 | 850.3 | 282.8 | 3722 | 1589 | 5844 | 737 |
| Stress crack failure | 0 | — | — | 20 | 0 | 0 | 0 |
| Deformation,% | | | | | | | |
| at 75°C. | 0 | — | — | 3.2 | 0 | 2.8 | 0 |
| 90 | 0.5 | — | — | 31.5 | 0 | 27.2 | 0 |
| 95 | 10.5 | — | — | 67.0 | 3.1 | 68.3 | 0.69 |
| 100 | 71.2 | — | — | 72.9 | 32 | 75.4 | 2.8 |

(a) aged 14 days
(b) ASTM No. 3 oil used

What is claimed is:

1. A semi-conducting composition of:
   i. a copolymer of ethylene and ethyl acrylate or vinyl acetate comonomer having a comonomer content of 2 to 5 weight per cent,
   ii. an ethylene-propylene-termonomer elastomer in an amount of from 3 to 20 weight per cent of said composition, and
   iii. a conducting carbon black in an amount of from 25 to 50 weight per cent of said composition.
2. A semi-conducting composition as claimed in claim 1 wherein the comonomer content in the copolymer is from 3 to 5 weight per cent.
3. A semi-conducting composition as claimed in claim 1 wherein the copolymer has a melt index below 3.5 decigrams per minute.
4. A semi-conducting composition as claimed in claim 1 wherein the copolymer is ethylene-ethyl acrylate.
5. A semi-conducting composition as claimed in claim 1 wherein the copolymer is ethylene-vinyl acetate.

* * * * *

UNITED STATES PATENT OFFICE
CERTIFICATE OF CORRECTION

Patent No. 3,849,333     Dated November 19, 1974

Inventor(s) K. A. Lloyd et al

It is certified that error appears in the above-identified patent and that said Letters Patent are hereby corrected as shown below:

In the title, line 3, "ethylarcralate" should read ---ethyl acrylate---.

Column 2, line 4, delete "28" and insert therefore ---contain---.

Signed and sealed this 21st day of January 1975.

(SEAL)
Attest:

McCOY M. GIBSON JR.
Attesting Officer

C. MARSHALL DANN
Commissioner of Patents